United States Patent
Williams

[11] Patent Number: 6,029,550
[45] Date of Patent: Feb. 29, 2000

[54] REAR DISC BRAKE PISTON TOOL

[75] Inventor: Danny L. Williams, Clarinda, Iowa

[73] Assignee: The Lisle Corporation, Clarinda, Iowa

[21] Appl. No.: 09/116,400

[22] Filed: Jul. 16, 1998

[51] Int. Cl.[7] .................................................. B25B 23/00
[52] U.S. Cl. ........................ 81/461; 81/439; 81/176.15
[58] Field of Search ........................... 81/437, 439, 461, 81/176.1, 176.15, 180.1, 488; 7/100

[56] References Cited

U.S. PATENT DOCUMENTS

| | | | |
|---|---|---|---|
| 120,304 | 10/1871 | McBride | 81/177.8 |
| 1,239,131 | 9/1917 | Shay | 81/439 |
| 1,717,241 | 6/1929 | Moritsky | 81/437 |
| 2,515,558 | 7/1950 | Kluth | 81/439 |
| 4,158,375 | 6/1979 | Cournoyer | 81/439 |
| 5,154,102 | 10/1992 | Becker | 81/176.15 |

FOREIGN PATENT DOCUMENTS

| | | | |
|---|---|---|---|
| 449929 | 3/1913 | France | 81/176.15 |
| 992395 | 7/1951 | France | 81/439 |
| 155500 | 7/1956 | Sweden | 81/439 |

OTHER PUBLICATIONS

K–D Tools Catalog—Mar., 1992—pp. 48–49, E. 3163 Disc Brake Piston Tool.

*Primary Examiner*—David A. Scherbel
*Assistant Examiner*—Joni B. Danganan
*Attorney, Agent, or Firm*—Banner & Witcoff, Ltd.

[57] ABSTRACT

A rear disc brake piston tool for use in combination with a drive ratchet to rotate a piston associated with a brake caliper is comprised of a cast metal cube with throughbores to receive the drive ratchet and projecting pins on each cube face to engage with piston cavities of various configuration.

1 Claim, 3 Drawing Sheets

REAR DISC BRAKE PISTON TOOL

BACKGROUND OF THE INVENTION

In a principal aspect, the present invention relates to a tool for rotating the piston associated with the caliper of a rear disc brake to facilitate servicing the brake by replacement of the pads, and more particularly to a tool which fits at least eight different piston head configurations.

Heretofore there has been disclosed and used a tool for disc brakes comprising a precast metal cube which includes throughbores extending into the cube along axes passing through the midpoint of each side of the cube and further including projecting pins along five of the sides. The projecting pins from the side surfaces of the cube are designed to interface with a cavity in the outside face of a brake piston. The pins of the five cube sides are thus configured to fit six different piston cavity patterns or configurations of a rear disc brake piston. The tool is designed to receive a drive ratchet and extension in the center throughbore passage to drive the tool when pins are engaged with a piston head.

The tool described has certain limitations, however, inasmuch as the pin configurations have limited utility and typically will coact with only six different piston cavity configurations. That is, manufacturers of vehicles use more than six cavity configurations on their disc brake caliper pistons. And in recent years, many additional piston configurations have been developed. Consequently, the described brake piston tool has not been useful with many of the new cavity configurations.

Thus there has developed the need for an improved rear disc brake piston tool having more universal utility and application to a broader range of piston cavity configurations associated with rear disc brakes and disc brakes in general.

SUMMARY OF THE INVENTION

Briefly, the present invention comprises a disc brake piston tool of cast, metal cube construction wherein the cube includes a set of projecting pins from each of the six surfaces of the cube, thereby permitting utilization of the tool in combination with many additional piston cavity configurations. The precast cube thus has six sides which are arranged in the form of a regular, square cube. An axis is defined through the midpoint of each face of the cube and three axes intersect at the center point of the cube to define an orthogonal array. Coaxial throughbores extend through each of the faces of the cube and are designed for receipt of a drive ratchet so that the cube may be mounted on a ratchet drive and maintained in position to drive or rotate a brake piston. Each one of the six faces of the cube includes an array of axially projecting pins having a unique configuration adapted to co-act with one or more disc brake piston cavity configurations. A minimum of eight different cavity configurations may be engaged by the pin arrays of the tool.

Thus it is an object of the invention to provide an improved rear disc brake piston tool capable of cooperating with and driving multiple different pistons having different cavity configurations.

Yet a further object of the invention is to provide a disc brake piston tool comprising a regular square cube having unique pin configurations on each of its six faces.

A further object of the invention is to provide a disc brake piston tool which may be manufactured by a metal casting operation wherein the gate for the cast tool projects from one of the six faces or sides of the cube forming the tool in a manner which permits easy machining and removal of the gate to finish the tool.

Another object of the invention is to provide a rear disc brake piston tool which has universal application and therefore is economical to use, easy to manipulate, rugged and inexpensive.

These and other objects, advantages and features of the invention will be set forth in the detailed description which follows.

BRIEF DESCRIPTION OF THE DRAWING

In the detailed description which follows, reference will be made to the drawing, comprised of the following figures.

DESCRIPTION OF THE PREFERRED EMBODIMENT

Figure 1:
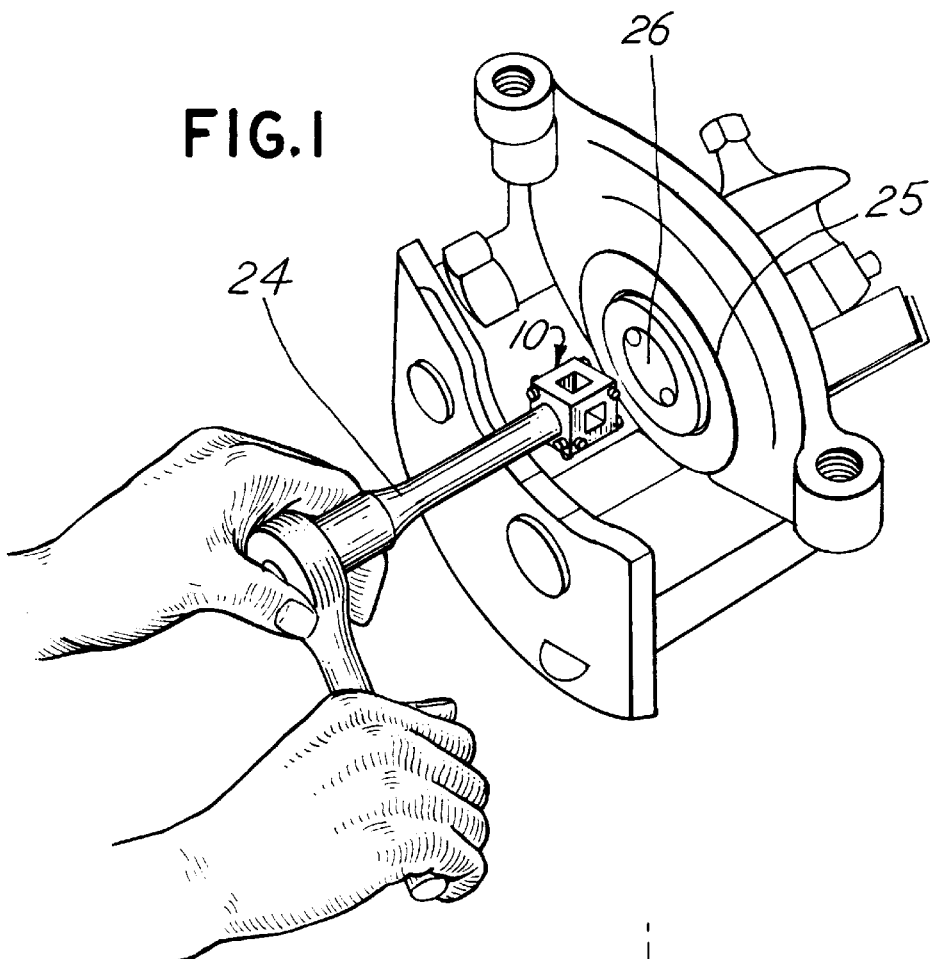
FIG. 1 is an isometric view of a disc brake assembly depicting the manner in which the tool of the present invention is positioned with respect to the piston cavity associated with the disc brake construction for adjustment, removal and replacement.
Figure 2:
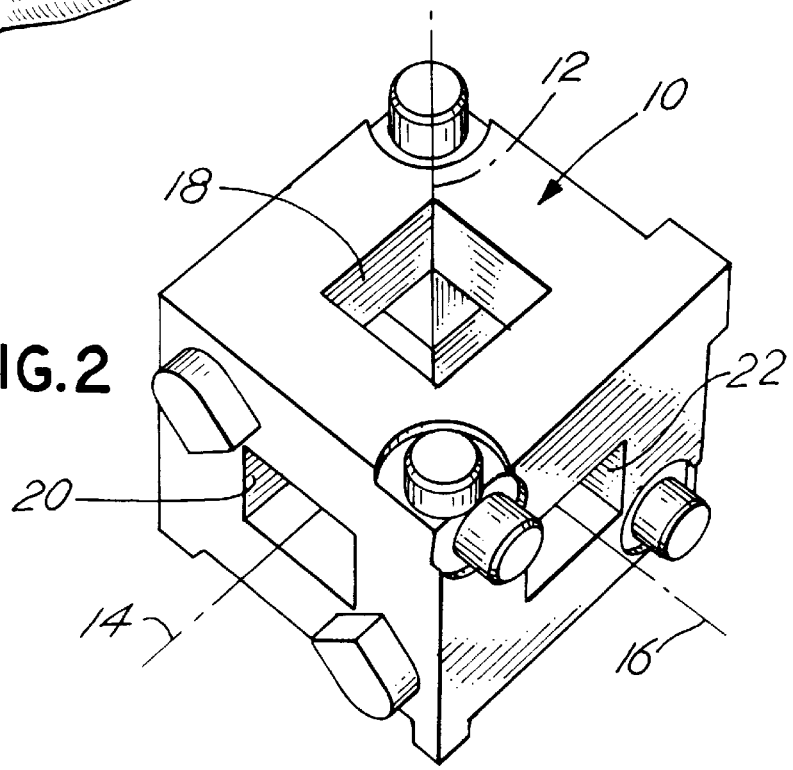
FIG. 2 is an enlarged perspective view of the improved tool of the invention.

Referring to FIGS. 1 and 2, the tool or cube 10 of the present invention comprises a precast, square sided, metal cube 10 having equally sized sides. The cube is a right angle cube and includes orthogonal axes 12, 14 and 16 which pass through the midpoints of opposite faces of the cube and intersect at the midpoint of the cube. The axes 12, 14 and 16 thus form an orthogonal system. Coaxial with each separate axis 12, 14 and 16 is a separate square cross section throughbore 18, 20 and 22 respectively. Each throughbore 18, 20, 22 is equally sized and, in the preferred embodiment, is configured in size to receive a ⅜" drive ratchet. Thus, as depicted in FIG. 1, a ⅜" ratchet 24 is fitted into a throughbore 18, 20 or 22. The tool 10 and, more particularly, pins projecting from one of the faces thereof, is then fitted into the face of a disc brake piston, namely face 26. In this manner, the piston 25 may be rotated to thereby appropriately adjust the caliper when replacing the disc brake pads, for example.

FIGS. 9A through 9F depict the various cavity configurations of the face of a piston 25. Each one of these cavity configurations may be engaged by the tool 10 and, more particularly, pins projecting from one of the faces of the tool 10. Table One below correlates the pin configuration or pattern of the various faces with the piston face cavity configurations of FIGS. 9A through 9H and further correlates the piston cavity configurations with various models of vehicles.

Figure 3:
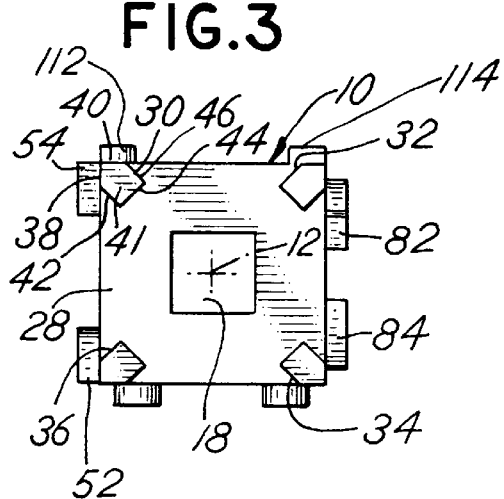
FIG. 3 is a plan view of the first side of the tool of FIG. 2.

Referring to FIG. 3, there is depicted in an elevation view face 28 of a first square side of tool 10. Face 28 is planar and throughbore 18 extends through the face 28 coaxial with the axis 12. The throughbore 18 is thus a regular rectangular parallelpiped configuration.

Projecting from the first face 28 in an axial direction are four pins 30, 32, 34, and 36. Each pin 30, 32, 34, 36 is substantially identical in size and configuration. Thus the description with respect to one pin will apply to the others. It is noted that each of the pins 30, 32, 34, 36 are positioned at a junction or corner of the face 28. The pins 30, 32, 34, 36 also each lie along a diagonal correcting the corners of the face 28. Pin 30, for example, includes a first face or side 38 which comprises an extension of a lateral side face of the cube 10. Pin 30 further includes a second side face 40 which comprises an extension of the next adjacent orthogonal face of the cube 10. The top 41 of the pin 30 is planar as is the face 28 and is parallel to the face 28. The pin 30 further includes three additional sides 42, 44 and 46. Sides 42 and 46 are parallel to one another and parallel to a diagonal between opposite corners of the face 28 associated with pins 30 and 34. Face 44 is perpendicular to that same diagonal extending between corners associated with pins 30 and 34. Each of the pins 30, 32, 34 and 36 is positioned at one of the separate corners of the face 28. Each of the pins 30, 32, 34 and 36 have an equal height from the face 28.

Figure 4:
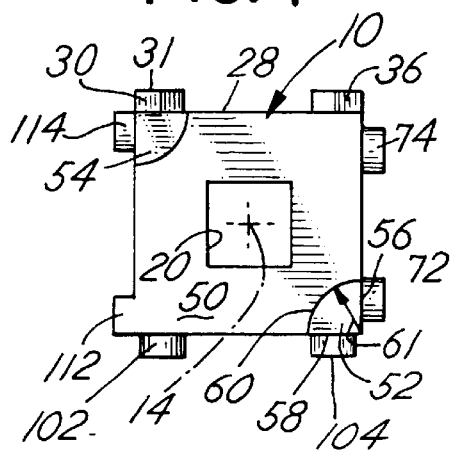
FIG. 4 is an elevation of the second side of the tool of FIG. 2.

FIG. 4 illustrates the pin configuration associated with a second face or second side 50 of the cube or tool 10. Again, the face 50 is planar and throughbore 20 extends through the face 50. The face 50 includes first and second projecting pins 52 and 54. The pins 52 and 54 are arrayed on the same diagonal across the face 50 and have the same vertical height. Pins 52, 54 each include lateral sides such as sides 56 and 58 which constitute extensions of the next adjacent face of the cube or tool 10. An arcuate surface 60 connects the surfaces or sides 56 and 58 and is defined by a radius 61 having its center at the juncture of the surfaces 56 and 58.

Figure 5:
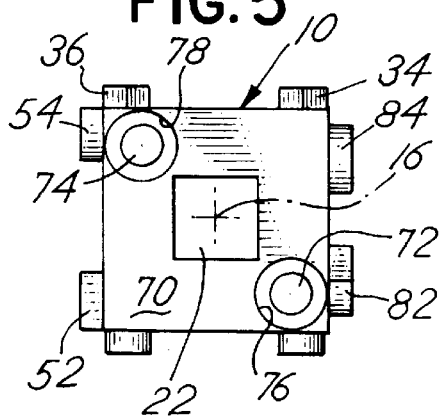
FIG. 5 is an elevation of the third side, or side number 3, of the tool.

FIG. 5 illustrates a further face, or third side 70, of the cube or tool 10. The face 70 includes a throughbore 22 which, like the other throughbores extends through the cube or tool 10 and is coaxial with one of the axes 12, 14, 16. Projecting from the face 70 and arrayed along a diagonal of the face 70 are cylindrical pins 72 and 74. The pins 72 and 74 are surrounded by a recessed groove 76 and 78 respectively in the surface 70. The sides of the grooves 76 and 78 are tangent to the adjacent side faces to the face 70. The pins 72 and 74 are concentric with their respective grooves 76 and 78 and of equal vertical height.

Figure 6:
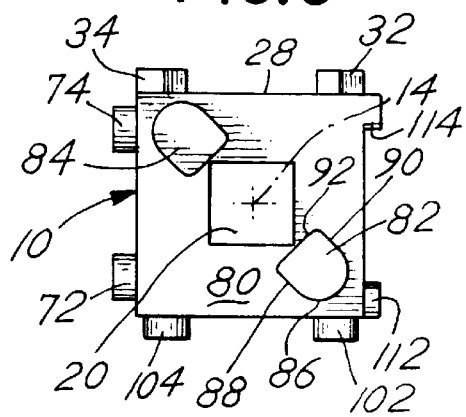
FIG. 6 is a side elevation of the fourth side of the tool.

FIG. 6 illustrates a fourth side or face of the tool 10. Throughbore 20 projects through face 80. Arrayed along a common diagonal of the face 80 are projecting pins 82 and 84. The pins 82 and 84 are spaced from the adjacent sides of the tool or cube 10 and include an arcuate or semi-cylindrical surface 86, generally planar side surfaces 88 and 90 which are parallel to the diagonal connecting the opposite corners of the surface 80, associated with the pins 82 and 84 and a transverse or perpendicular surface 92 which is connected through curved corner surfaces to the side surfaces 88 and 90.

Figure 7:
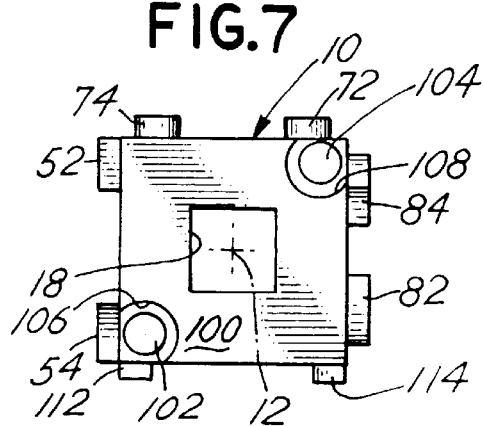
FIG. 7 is a side elevation of the fifth side of the tool.

FIG. 7 illustrates a fifth face 100 through which a throughbore 18 projects. Equal height cylindrical pin projections 102 and 104 project from the face 100. The pin projections 102 and 104 include a peripheral groove 106 and 108 respectively. The pins 102 and 104 are generally tangent to the adjacent sides of the tool 10. The pins 102 and 104 are also concentric with the grooves 106 and 108.

Figure 8:
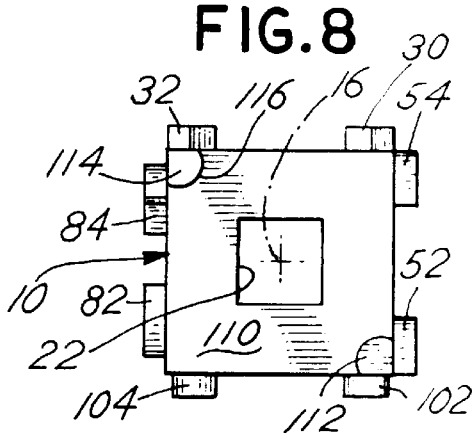
FIG. 8 is a side elevation of the sixth side of the tool.

FIG. 8 illustrates a sixth side or face 110 of the tool or cube 10. The face 110 includes a throughbore 22. Arrayed along a diagonal on the face 110 at the corners of the cube are projecting pins 112 and 114. Each of the pins 112 and 114 are substantially identical in configuration. They comprise a portion of a cylinder wherein the centerline axis of the cylinder is equi-distant from projections of the side faces adjacent to the sixth face 110. The center of an arcuate surface 116, therefore, is within the sides of the outer boundaries or limits of the face 110. The radius of the pins 112 and 114 is less than the radius of the pins in the second side or face 50, namely the pins 52 and 54.

The separate face pin configuration as described can be correlated with the various piston cavity configurations associated with various models of vehicles in accord with the following table.

TABLE ONE

Figure 9A:
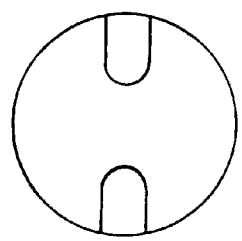
FIG. 9A–FIG. 9F comprise different piston face configurations which may be actuated by the tool of the invention.
Figure 9B:
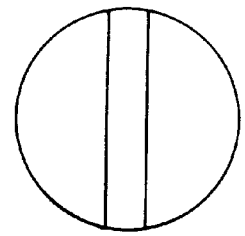
Figure 9C:
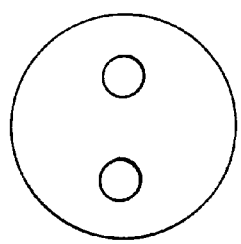
Figure 9D:
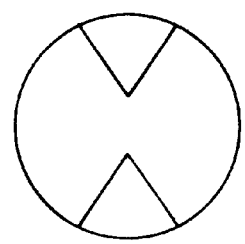
Figure 9E:
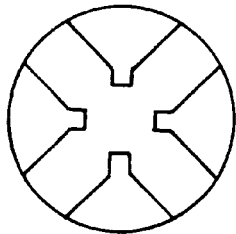
Figure 9F:
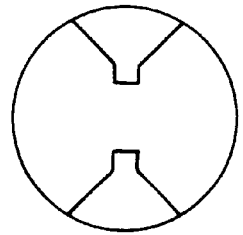

| Side or Face | Pin Cavity Configuration | Vehicle Types |
| --- | --- | --- |
| Side 1 | FIG. 9A | |
| Side 2 | FIG. 9B | |
| Side 3 | FIG. 9C | |
| Side 4 | FIG. 9D | 94–97 Olds Cutlass, |
| | | 94–96 Pontiac Grand Prix, |
| | | 95–97 Lumina, 95–97 Monte Carlo, |
| | | 94–96 Buick Regal |
| Side 5 | FIG. 9E | |
| Side 6 | FIG. 9F | 93–95 Lincoln Continental, |
| | | 93–95 Mercury Sable, |
| | | 93–95 Ford Taurus |

In use then, a vehicle type is identified. Thereafter, the vehicle type is correlated to the pin cavity configuration using a table as set forth above. Knowing the pin cavity configuration, a mechanic can then identify the face among the six faces of the cube or tool 10 which should be exposed for engagement with the pin cavity configuration. The throughbore through that face is the same throughbore into which a ratchet tool is inserted from the side opposite the face which is to engage the cavity configuration. The ratchet 24 is then attached to the cube or tool 10 and the tool may then be inserted into the piston cavity configuration for rotation and adjustment of the piston.

Various pin configurations have been described but it is to be understood that modifications may be made to the pin configuration, to the size and surface configuration of the cube and to the throughbore by way of example. Thus the invention is to be limited only by the following claims and their equivalents.

What is claimed is:

1. A rear disc brake piston tool for use in combination with a drive ratchet to rotate a piston of a brake caliper when replacing disc brake pads, said piston tool comprising:

a metal cube having six equal sized sides and faces, three perpendicular intersecting axes at the midpoint of each face of the cube, each axis intersecting at a midpoint of opposed spaced cube sides, and three coaxial, polygonal throughbores for receipt of a drive ratchet from any one of the six cube sides, said through bores having a substantially identical cross section configuration, each of said side faces having four corners, a substantially unique pattern of axially outwardly projecting drive pins for engaging end cavities in a disc brake piston, and including two pair of opposite, diagonal corners with connecting diagonals:

(a) the first one of said side faces comprising a separate pin at each of the four corners of said first side, each pin having five surfaces extending from the first side face with two of said surfaces defined by extensions of adjacent side faces of the cube and the remaining surfaces parallel to one diagonal of said first side face and perpendicular to the other diagonal;

(b) the second one of said side faces comprising first and second pins at opposite diagonal corners of said second side face, each pin having three surfaces extending from the second side face, two of said surfaces defined by extensions of adjacent side faces of the cube and the remaining surface comprising an arcuate connection therebetween having an arcuate radius;

(c) the third one of said side faces comprising first and second projecting cylindrical pins near one pair of opposite diagonal corners of said side, each pin surrounded by a circular groove on the third side face;

(d) the fourth one of said side faces comprising first and second projecting semi-cylindrical pins on one diagonal between corners of said side face with a flat side of each pin in direct opposed relation and a rounded side symmetrically positioned opposite a corner of the side face;

(e) the fifth one of said side faces comprising first and second projecting cylindrical pins near opposite diagonal corners of said side face and coplanar with adjacent sides to said fifth side face, each pin partially surrounded by a circular groove in the fifth side face; and (f) the sixth one of said side faces comprising first and second pins at the opposite diagonal corners of said sixth side face, said pins each having three surfaces, two of said pins defined by extensions of adjacent side faces of the cube and the remaining surface comprising an arcuate connection therebetween with an arc radius less than that of the arcuate radius of the second side pins.

* * * * *